United States Patent
Jolfaei

(10) Patent No.: US 9,654,576 B2
(45) Date of Patent: May 16, 2017

(54) DATABASE TRIGGERED PUSH NOTIFICATION

(71) Applicant: Masoud Aghadavoodi Jolfaei, Walldorf (DE)

(72) Inventor: Masoud Aghadavoodi Jolfaei, Walldorf (DE)

(73) Assignee: SAP SE, Walldorf (DE)

( * ) Notice: Subject to any disclaimer, the term of this patent is extended or adjusted under 35 U.S.C. 154(b) by 110 days.

(21) Appl. No.: 14/484,293

(22) Filed: Sep. 12, 2014

(65) Prior Publication Data
US 2016/0080512 A1 Mar. 17, 2016

(51) Int. Cl.
G06F 15/16 (2006.01)
H04L 29/08 (2006.01)
G06F 17/30 (2006.01)

(52) U.S. Cl.
CPC .......... H04L 67/26 (2013.01); G06F 17/3051 (2013.01); G06F 17/30386 (2013.01); G06F 17/30864 (2013.01); G06F 17/30867 (2013.01); H04L 67/2842 (2013.01)

(58) Field of Classification Search
CPC ................................................ G06F 17/30902
USPC ........................................ 709/206, 200, 203
See application file for complete search history.

(56) References Cited

U.S. PATENT DOCUMENTS

| | | | |
|---|---|---|---|
| 2002/0116457 A1* | 8/2002 | Eshleman | H04L 29/06 709/203 |
| 2004/0193653 A1* | 9/2004 | Howard | G06F 17/30368 |
| 2004/0267824 A1* | 12/2004 | Pizzo | G06F 17/30902 |
| 2013/0086146 A1* | 4/2013 | Addala | H04L 12/4625 709/203 |

OTHER PUBLICATIONS

Jellema, Lucas.; Jun. 18, 2012; Notifying ADF applications of database changes—Part I; Web article.*
Jellema, Lucas.; Jun. 19, 2012; Notifying ADF applications of database changes—Part II; Web article.*

* cited by examiner

*Primary Examiner* — El Hadji Sall

(57) ABSTRACT

Systems and methods of database triggered push notification are disclosed. In one aspect, data from a database entity is cached in response to executing user service request at a client session, where the service request involves information from the database entity. In response to caching the data from the database entity, the client session subscribing to a messaging channel dedicated to the database entity. In another aspect, a message is generated as a result of invoking a trigger by an operation in the database entity. In yet another aspect, the message is transported by the messaging channel to the subscribed client session to invoke refresh of the cached data. A push notification is sent to the client in response to the message.

15 Claims, 7 Drawing Sheets

DATABASE TRIGGERED PUSH NOTIFICATION

BACKGROUND

One of the current trends in business applications is the demand to manage data which is rapidly increasing in both volume and complexity, e.g., the so called "Big Data" environments. At the same time, enterprises look for opportunities to simplify and make their operations more efficient. The modernization of the information systems is a crucial factor. The adoption of new technologies such as in-memory databases, mobile business applications, cloud computing, etc., offer the means for improving business processes and overall enterprise efficiency, which also helps to introduce new services to customers, lower costs, and ensure competitive advantage by better market positioning.

One way to improve and simplify the management of voluminous and complex data is to work with subsets or snapshots of data, focusing on select database entities. Such entities could be different structures (tables, views, etc.) which are read from a database and stored in a cache, e.g., in operative memory as application context. Furthermore, most of the resource consuming calculations could take place directly within the databases, e.g., as a stored procedure, which is especially efficient for in-memory database solutions. Additionally, the cached data and the actions applied on the data can be displayed using user interfaces of lightweight client applications on various network-enabled client devices.

As the database entities can change dynamically, the cached and displayed data should be frequently refreshed to minimize any risks to data consistency, e.g., caused by stored database calculations, various operations on the cached data, etc. Usually, the cached database entities are re-checked/re-read as frequently as reasonable and feasible, wherein the smaller intervals between refreshing the cached data lowers the risk for data inconsistency but increases system load.

BRIEF DESCRIPTION OF THE DRAWINGS

The claims set forth the scope with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for database triggered push notification are described herein. In the following description, numerous specific details are set forth to provide a thorough understanding of the embodiments. One skilled in the relevant art will recognize, however, that the ideas presented can be practiced without one or more of the specific details, or with other methods, components, materials, etc. In other instances, well-known structures, materials, or operations are not shown or described in detail to avoid obscuring.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Figure 1:
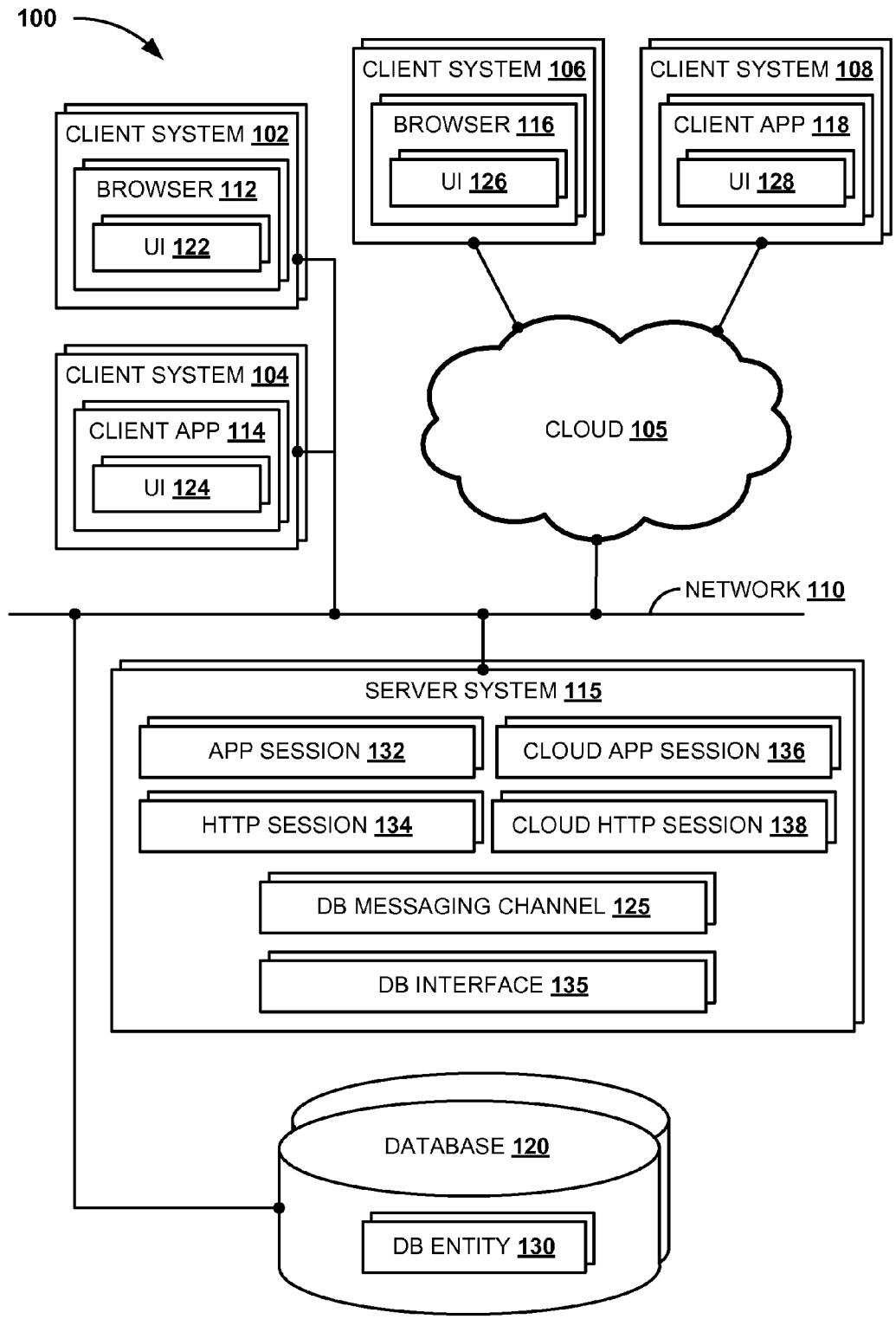
FIG. 1 is a block diagram illustrating exemplary computing environment 100 providing event driven database notification, according to an embodiment.

FIG. 1 is showing exemplary computing environment 100 providing event driven database notification, according to one embodiment. Environment 100 schematically illustrates some of the general elements of the typical enterprise information system landscapes, including client systems 102-108 connected to server system 115 and database 120 via network 110. In one embodiment, there may be at least one or multiple client systems (102-108), as well as more than one server system 115 and more than one database 120, depending upon the implementation. Other system modules, not illustrated in the figure, could also be present.

The server system 115 and the database 120 may provide various enterprise services to local or remote users requesting and/or consuming the services through client systems 102-108. Such services may include business applications such as Enterprise Resource Planning (ERP), Customer Relationship Management (CRM), various data analytics applications, etc. The services could be provided as on-premise solutions, e.g., within the enterprise information systems landscape (at client systems 102 and 104). Alternatively or in addition, the services could be provided as cloud-based services, e.g., via cloud 105 infrastructure (at client systems 106 and 108), where server system 115 and/or database 120 may be configured as cloud-based infrastructure.

In one embodiment, a user operating at one or more of client systems 102-108 interacts with at least one user interface (UI 122, UI 124, UI 126 and/or UI 128) provided by a corresponding client application (browser 112, client app 114, browser 116, and/or client app 128, respectively). The UIs (122, 124, 126 and 128) may provide users with access to information and functionalities of server system 115. Generally, some UIs (e.g., 124 and 128) can be provided or generated by client applications (e.g., 114 and 118) specifically built for rendering and handling UIs to enable a predefined set of services. Other UIs (e.g., 122 and 126) can be implemented as extensions or plug-ins to more general client applications such as internet browsers (e.g., 112 and 116). Sometimes, such applications or application extensions providing specific UIs are referred to as UI agents.

A UI agent (112, 114, 116 or 118) may include functionalities for connecting to server system 115 and/or database 120, in addition to rendering the corresponding UI (122, 124, 126 or 128) on a display device of the client system (102, 104, 106 or 108). For example, the UI agent may handle setting up a dedicated communication connection between the UI agent (e.g., 112, 114, 116 or 118) and the target server system (e.g., 115), and authenticating a user to the server system (e.g., 115). In some environments, setting up such a UI communication connection may include the generation of a corresponding proxy session at the server system (115) for executing the functions requested through the UI agent (112, 114, 116 or 118). In FIG. 1, these proxies are illustrated with sessions 132, 134, 136 and 138, which correspond and may be dedicated to UI agents 112, 114, 116 and 118, respectively. Such sessions may be also referred to as UI sessions.

Application sessions (132 and 136) may correspond to UI agents generated by specifically built client applications (112 and 116, respectively), while HTTP (from Hypertext Transfer Protocol) sessions (134 and 136) may be generated for UI agents built-in browsers (114 and 118, respectively), according to one embodiment. Sessions specific to cloud clients may be generated as well (e.g., 136 and 138). In one embodiment, when a client UI agent is instantiated, the instantiation of a corresponding UI session at the server system is requested to handle the functionalities associated with servicing user requests, such as, displaying data, executing business transactions, etc.

When a specific service or services are requested by a user is associated with accessing data, e.g., stored at database 120, information pertinent to the service may be cached at a particular session handling the requests. Thus, the requests could be executed much faster, especially in "Big Data" scenarios, as the cache is usually stored in volatile memory, and provides context for the session operations. Often, the same database (DB) entities (e.g., DB entity 130) may be referred to, and hence cached by, more than one sessions corresponding to more than one concurrent UI agents. Thus, the caching also improves the concurrent access to data, but also creates a risk of inconsistency if the common data is altered by one or more of the sessions. To minimize this risk and to avoid unnecessary synchronization of the cached data with the database 120, a database triggered push notification mechanism is implemented, according to one embodiment.

According to this mechanism, when a DB entity (e.g., 130) is altered, for example, in response to an operation related to a user request (such as, create, read, update and delete (CRUD) data), a message could be sent to DB messaging channel 125. In one embodiment, the message may be generated or triggered (e.g., by a database trigger) as a result of the change in DB entity 130, and pushed to the DB messaging channel 125 via common DB interface 135 that handles the communication between the server system 115 and the database 120. Then, the message may be forwarded (e.g., by the DB messaging channel 125) to one or more of the sessions (132-138) that are caching data from DB entity 130 as a notification that some data stored in DB entity 130 have been altered, and hence the cached data may no longer be consistent. In response to the notification that the data may no longer be consistent, the sessions may invoke a refresh of the cached data as necessary.

Figure 2:
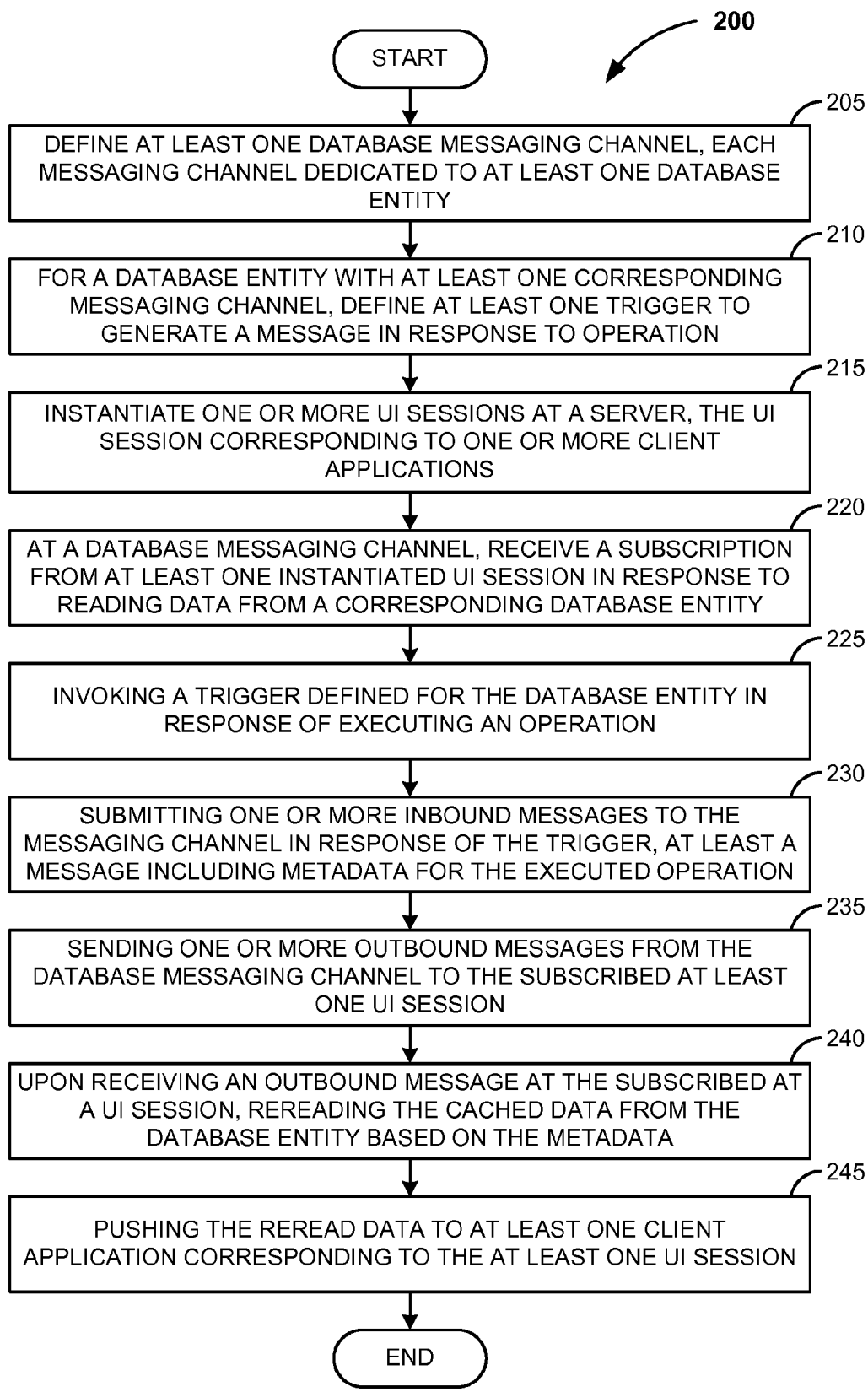
FIG. 2 is a flow diagram illustrating a database triggered push notification, according to an embodiment.

FIG. 2 shows process 200 illustrating in more detail the mechanism for database triggered push notification, according to an embodiment. At 205, at least one messaging channel is defined. The at least one messaging channel may be dedicated to one or more database entities. In one embodiment, a one-to-one correspondence between database entities and messaging channels may be defined. The messaging channels could be defined, instantiated and managed at application messaging infrastructure or framework, established at an application server. The communication between a database entity and a corresponding messaging channel may be routed via the same communication service operable to handle the communication between the application server and the database. Alternatively, an interface may be specifically built to handle the communication between the database entities and the messaging channels.

At 210, at least one trigger is defined for a database entity with at least one corresponding messaging channel. In one embodiment, the trigger could be defined as database entity trigger according to the database engine functionality to react to a specific operation or operations executed at the database entity. In one embodiment, the trigger may generate a message in response to the operation, and send the message to the corresponding messaging channel, e.g., as an inbound message.

At 215, one or more UI sessions are instantiated at the application server, where the UI sessions correspond to one or more client applications. In one embodiment, a session may be instantiated in response to a user request. The user request may invoke a specific UI at a screen of a client, launch a specific server operation (e.g., service request), trigger a transaction, etc. At 220, at least one of the instantiated UI sessions may subscribe to a database messaging channel. Such a subscription may be a result of reading data from a database entity corresponding to the database messaging channel. The UI session may initially retrieve data from the database entity before or after the subscription to the messaging channel and submit the data to a cache (e.g., to cache the initial data), for improving the performance and flexibility, e.g., in answering other similar user requests. In one embodiment, the subscription may be a result of caching the data.

At 225, a trigger defined for the database entity is invoked, e.g., by execution of a predefined DB operation. The operation may be related to creating, reading, updating or deleting data (CRUD operations) in the database entity, e.g., a record or records in a database table. The execution of such operation, according to conditions in the trigger's definition, may lead to the generation and submission of one or more inbound messages to the corresponding messaging channel, at 230. In one embodiment, at least one message of the one or more inbound messages includes metadata for the executed database operation or action. The metadata may include identification information of the requestor of the change (e.g., session name), identification information of the database entity (e.g., table name), type and/or definition of the executed operation, etc.

Process 200 continues at 235 with sending one or more outbound messages from the database messaging channel to the subscriber at least one UI sessions. In one embodiment, the messaging framework generates and pushes out the one or more outbound messages in response to receiving the one or more inbound messages. In one embodiment, at least one of the one or more outbound messages includes at least a part of the metadata. For example, at least the type of the executed DB operation is communicated to the at least one UI session.

Upon receiving an outbound message at a UI session, the data cached from the database entity is partially or fully reread, e.g., refreshed or re-uploaded in the cache from the database entity, at 240. In one embodiment, the re-reading of data depends on the metadata communicated by the received outbound message. For example, if the type of DB operation is "READ", no rereading is necessary. Furthermore, only the affected data elements (e.g., records, fields, etc.) of the database entity, as identified by the DB operation definition may be refreshed in the UI session's cache. When data from the database entity is presented to one or more users, e.g., fully or partially displayed on at least one client device in a UI corresponding to the UI session, the refreshed data is pushed to the at least one client application at 245.

By following process 200, it could be ensured that when a database entity is updated, data previously cached from the database entity will be refreshed to avoid inconsistency. Such a refresh runs when triggered by relevant database operation or operations, which effectively minimizes system load.

In one embodiment, a UI agent may directly subscribe to the database messaging channel, and receive a notification directly, bypassing any existing UI session. The messaging channel is open for receiving subscriptions by various types of system objects, including UI sessions and connections (e.g., WebSocket communication channel over TCP/IP (transmission control protocol/ Internet protocol) connections). Such connections can be bound/connected (like a "pipe" in Unix operating systems) to the database messaging channel. In this case, a database messaging dispatcher will send notification not to a session but via the provided connection to the UI agent directly. Some data may be cached in the UI agent (e.g., 112-118 at client systems 102-108) and not in the server system (e.g., 115).

Figure 3A:
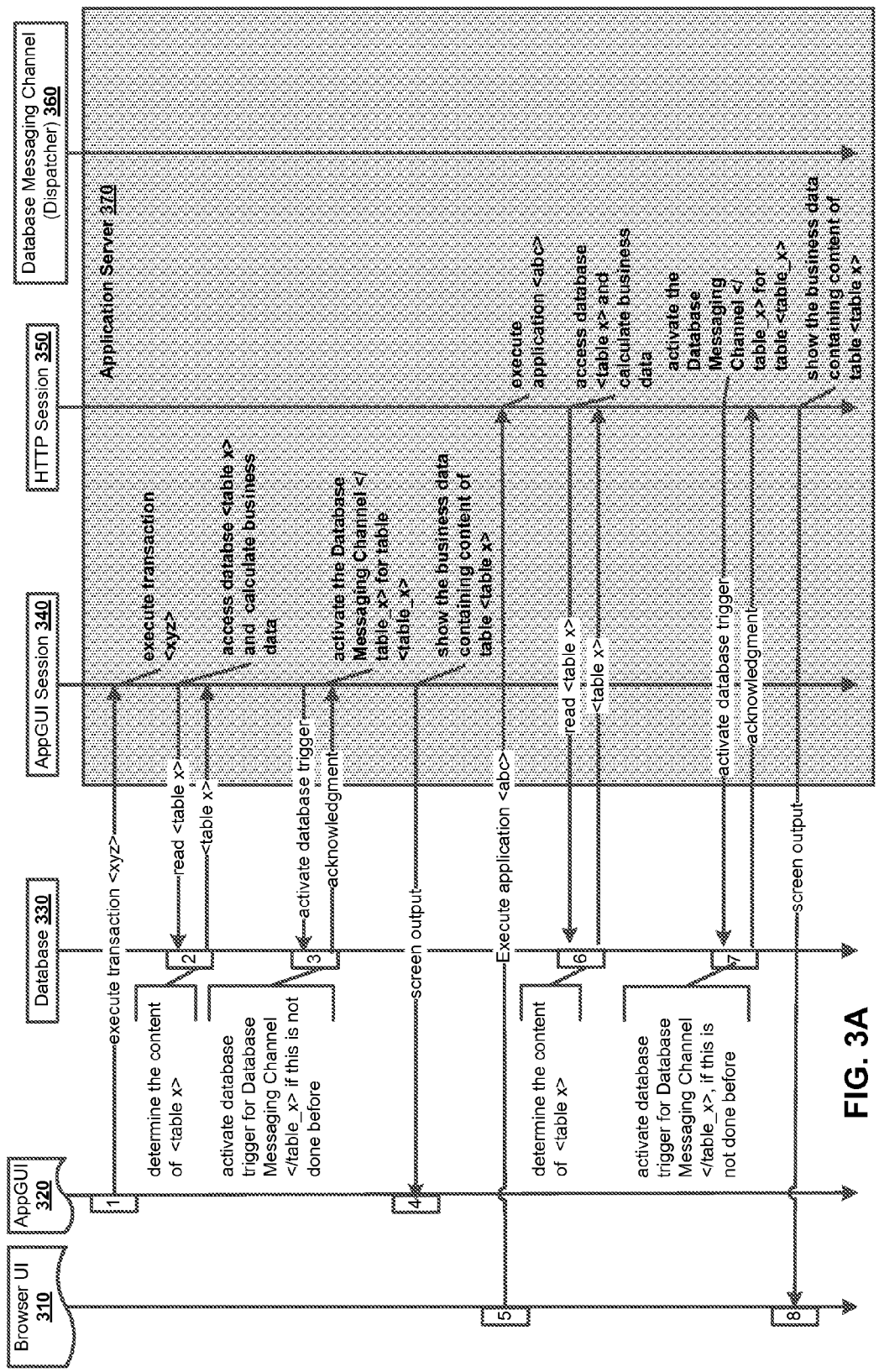
FIG. 3A is a flow diagram illustrating an example implementation of the database triggered push notification, according to an embodiment.
Figure 3B:
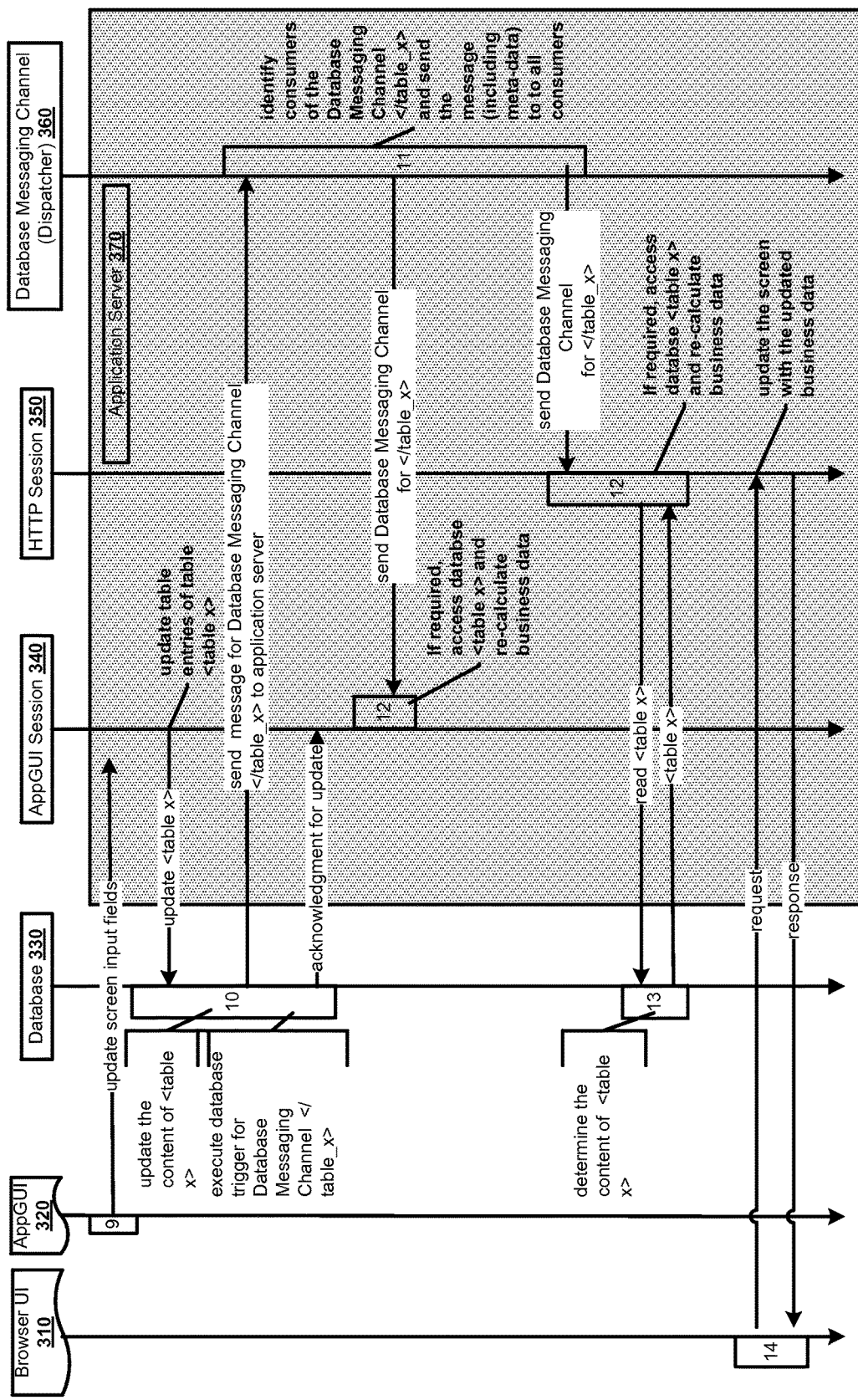
FIG. 3B is a flow diagram illustrating an example implementation of the database triggered push notification, according to an embodiment.

FIG. 3A and FIG. 3B shows an example implementation of the mechanism for database triggered push notification, according to one embodiment. The implementation is illustrated based on modules or system entities common for most of the business system platforms. More specifically, the system entities illustrated in FIG. 3A and FIG. 3B as participants of the database triggered notification mechanism, include browser UI 310, client application UI or AppGUI 320, database 330, client application server session 340 corresponding to the AppGUI 320, HTTP application server session 350 corresponding to browser UI 310, and database messaging channel 360.

The presented browser UI 310 could be based on various Web based application technologies for providing client UIs, either alternatively or in combination with browser UI 310. The AppGUI (e.g., the client application graphical UI) 320 may represent specially developed client applications for providing rich client interface to business applications. Both types of UI applications, browser UI 310 and AppGUI 320, when instantiated (e.g., in response to user requests), trigger the instantiation of the corresponding HTTP session 350 and AppGUI session 340, respectively, e.g., at application server 370 hosting the services provided via browser UI 310 and AppGUI 320.

The database messaging channel 360 may represent a proprietary or vendor provided messaging infrastructure built in the application server 370. In one embodiment, the messaging infrastructure supports push messaging, and may generate a separate messaging channel for a number of database entities. The database messaging channels could be generated in the database layer of the application server 370. In one embodiment, the database layer provides interface between the application server 370 and at least one external database (e.g., database 330). The database messaging channel 360 may represent a database messaging channel dispatcher or broker routing the database messages between the database entities and their corresponding messaging channels. In FIG. 3A and FIG. 3B, database 330 may represent a single database entity, e.g., "<table x>", and database messaging channel 360 may represent messaging channel "</table_x>", dedicated to database entity "<table x>".

In the example diagram illustrated in FIG. 3A and FIG. 3B, client applications (browser UI 310 and AppGUI 320) may run in parallel and apply changes to the same database entities, i.e. to database table "<table x>" (330). The affected database entity may be used to calculate business content, represent results, etc., according to the requests routed through the respective user agents (browser UI 310 and AppGUI 320). As illustrated, two or more clients may be active simultaneously, one in AppGUI 320 (reach user agent) and another in browser UI 310 applications. To an active user agent, e.g., AppGUI 320 and/or browser UI 310, a dedicated application server session (containing application context) may be instantiated, e.g., AppGUI session 340 and HTTP session 350. Both client applications or agents may execute business transactions which access the same database entity, e.g., database table <table x> 330.

As illustrated in the example, at stage 1 (FIG. 3A), the execution of a transaction (e.g., transaction "xyz") is requested at AppGUI 320, which requires reading and calculating data stored in database 330 (e.g., in "<table x>"). The request for execution of transaction "xyz" is transferred for handling to AppGUI session 340 at the application server 370. At stage 2, the AppGUI session 340 accesses database 330 to read the required content of "<table x>", and to apply the necessary calculations. The communication between AppGUI session 340 and database 330 may be handled by the database interface layer of the application server 370, according to one embodiment.

Further, at stage 3, a database trigger associated with "<table x>" may be activated, as well as the database messaging channel "</table_x>" dedicated to the database entity "<table x>", if not being activated already, e.g., by another process. The activation of the messaging channel cold mean its instantiation within the application server messaging framework. In one embodiment, the database trigger could be predefined, e.g., when the database entity ("<table x>") is created. The database trigger executes when invoked by a specified operation or operations applied to the database entity according to the definition, e.g., one or more of the Create Read Update Delete (CRUD) actions. At stage 4, business data containing or resulting from the data read from the database entity 330 (e.g., "<table x>") is sent to AppGUI 320 user agent for displaying on a screen or presenting otherwise.

Stages 5-8 generally repeat the process described with respect to stages 1-4. An execution of application (e.g., "abc") is invoked at HTTP session 350 based on a user request submitted at browser UI 310 application (stage 5). Similarly to transaction "xyz", the execution of application "abc" requires access to database 330 (e.g., database entity "<table x>") to read data (stage 6). The database trigger and the corresponding database messaging channel (e.g., "</table_x") are activated if not active already (stage 7), and the result of the execution of the application "abc" including and/or based on data from "<table x"> are outputted at browser UI 310 (stage 8).

In both stages 1-4 and 5-8, the content of database entity "<table x>" is read and cached, either completely or partially, in the associated sessions (AppGUI session 340 and HTTP session 350). At stages 3 and 7, the application sessions subscribe to database messaging channel (e.g., "</table_x>") that is dedicated to the database entity. The subscription is required to get a notification by the messaging framework (database messaging channel 360) as soon as any changes are applied to the database entity "<table x>", as illustrated with stages 9-14 in FIG. 3B.

For example, based on business logic underlying AppGUI 320 UI agent application, and the represented screens, a user is able to update screen elements. For example, the user may place a purchase order in an ERP application by manipulating screen input fields of the UI (stage 9). That manipulation leads to updates to database 330, and more specifically to updates of the content of database entity <table x> (stage 10). As a result, the activated trigger executes, and a message is sent to the corresponding database message channel "</table_x>" in the database message channel infrastructure 360. In one embodiment, the database messaging channels could be realized as application objects with transport capabilities and a number of specific properties (e.g., identification, access rights, interface, methods, etc.). The channel "</table_x>" may represent an instance of such an object, providing interface to the trigger associated with the database entity "<table x>" to submit a message. The message may transport metadata for the executed operation.

At stage 11, the database message channel 360 may represent the active messaging channels and a dispatcher or broker of the messaging framework of the application server, that gets the message submitted by the trigger to channel "</table_x>" and pushes a notification to the application sessions previously subscribed with the channel to receive such notifications (AppGUI session 340 and HTTP session 350). In one embodiment, the database message channel dispatcher 360 checks to identify the active consumers of messaging channel "</table_x>", and sends a message to the consumers. The message may include at least partially the metadata submitted by the database trigger.

In response to the broadcasted message from the database messaging channel 360, the AppGUI session 340 and HTTP session 350 may check whether re-calculation of the business data based on the content of the updated "<table x>" is required (stage 12). The check may be based on the metadata transported by the notification message. In the presented example, since the update is a result of the operations executed at the AppGUI session 340, no refresh or re-calculation of the cached data is necessary. However, HTTP session 350 rereads data with applied changes from database entity "<table x>" at database 330, and recalculates the results based on the updates (stage 13). The output business data based on the updates is sent to browser UI 310 to update the information presented to the user, e.g., in the displayed UI screens (stage 14).

The database triggered push notification helps establishing a low level event driven mechanism, tied directly to the database entities, that ensures data consistency. Besides updating the display of data, as illustrated with FIG. 3A and FIG. 3B, the mechanism could be used to ensure data consistency in other scenarios. For example, with the help of the database triggered push notification using database messaging channels, an efficient optimistic locking could be emulated. Such optimistic locking could prevent various issues with executing database transactions requested by concurrent clients, especially when the clients are built on different technologies. Also, by using the database triggered push notification, repeated database lock checks could be avoided.

Currently, there are two mechanisms for locking database resources during updates. One is a pessimistic database lock mechanism, where a database resource is locked in advance, e.g., by a UI session, to guarantee exclusive access during database operations (mainly during updates). The second mechanism, optimistic locking, does not set exclusive access to a requested database resource, but, instead, the application repeatedly checks or validates whether the data to be updated was not previously modified by another process (e.g., concurrent sessions). The repeated checks could be replaced by the event based notification. The lock collision events can be raised based on the database messaging channel mechanism as soon as the data entity of interest (e.g., "locked" by the emulated optimistic lock) is accessed by another session. The emulation of such a locking mechanism has an additional advantage of integrating systems that are based on different locking infrastructure.

Figure 4:
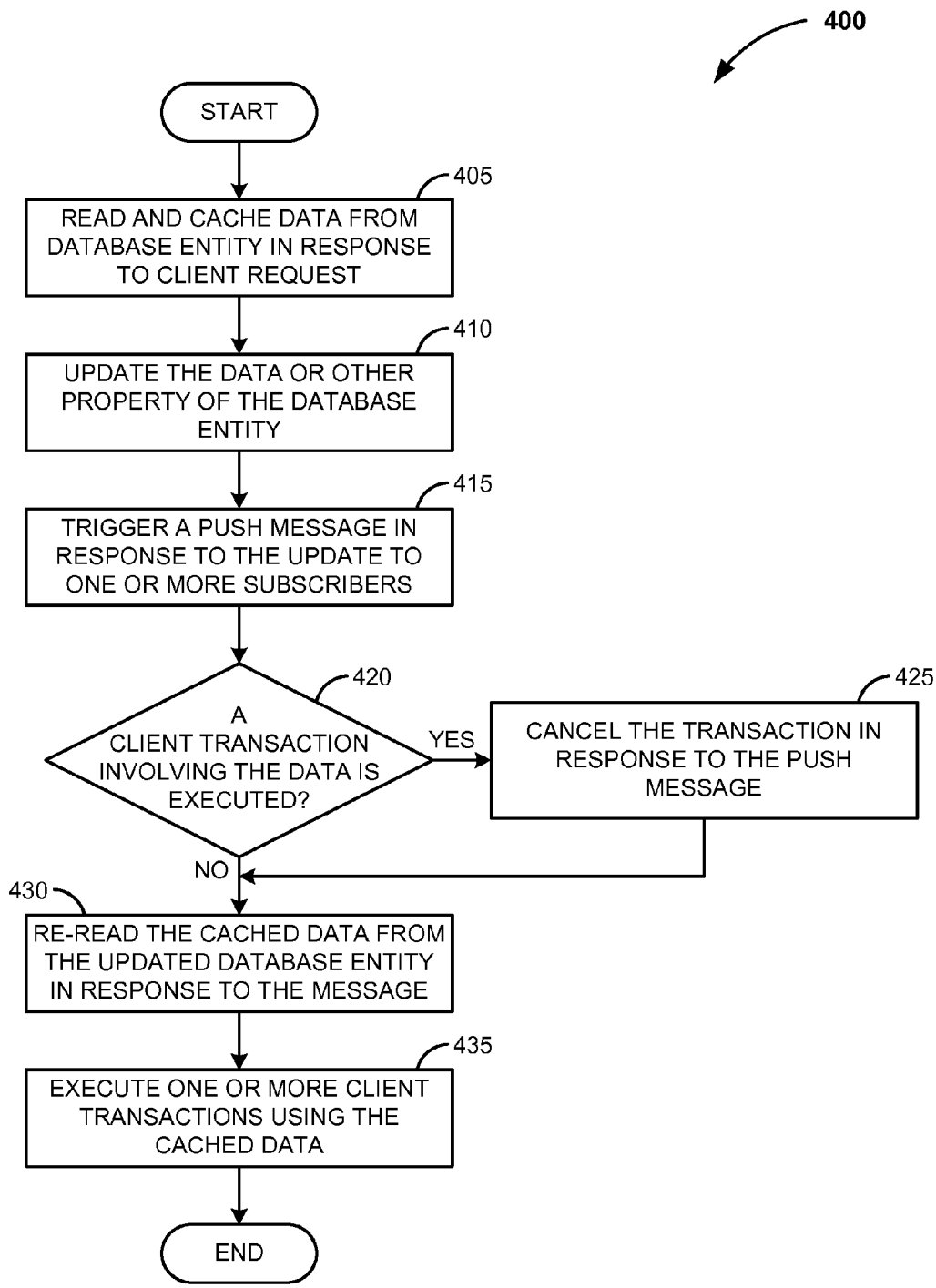
FIG. 4 is a flow diagram illustrating a process of optimistic locking emulated by database triggered push notification, according to an embodiment.

FIG. 4 shows process 400 for emulating an optimistic locking mechanism based on a database triggered push notification, according to one embodiment. At 405, data from a database entity is read and cached in response to a client request. The request could be sent in response to user action at a UI agent. At 410, the database entity is updated. That may include updating data stored in the database entity or/and updating other properties of the database entity such as its structure, behavior, etc. In response to the update, an associated or built-in database trigger is executed at 415 to push a message to one or more subscribers (sessions) via the database messaging channel framework, as explained above in reference to the previous figures.

Process 400 continues at 420, where a check is performed, at the notified active UI sessions, to determine whether there is a client transaction currently executing that involves data from the updated data entity. If there is such a transaction or transactions, they are canceled at 425 in response to the push message. At 430, the cached data is reread from the updated database entity in response to the push message notification. Further, the execution of one or more client transaction may continue using the refreshed cached data, at 435. Following the described process 400, no additional verification is necessary before committing a transaction at a shared database entity. In case of an update, all the currently executed transactions involving the updated data are canceled based on a push notification, according to one embodiment.

Figure 5:
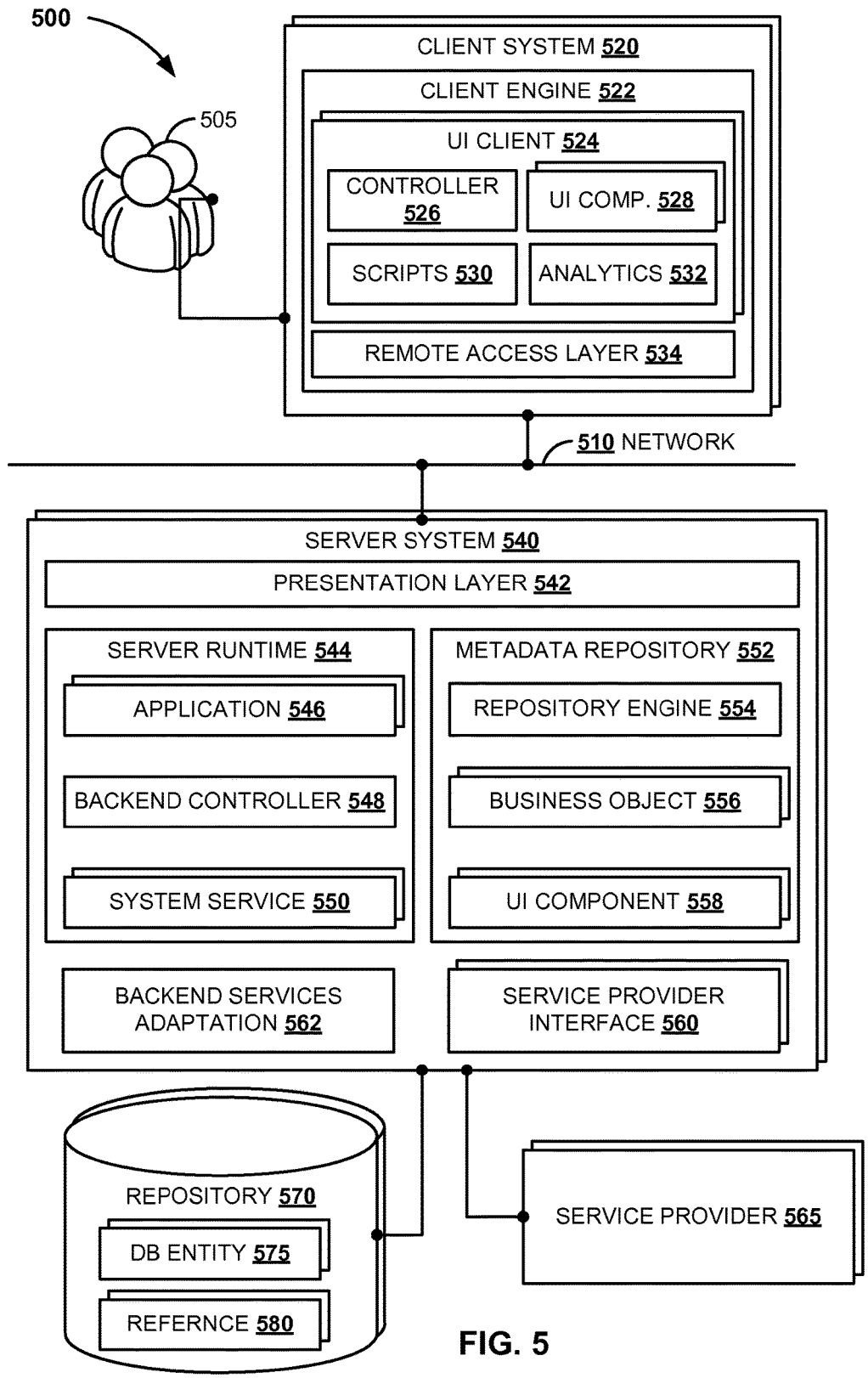
FIG. 5 is a block diagram illustrating a computer system landscape implementing a database triggered push notification, according to an embodiment.

FIG. 5 is a block diagram showing computer system landscape 500 where database triggered push notification is implemented for distributed systems, according to one embodiment. The computer system landscape 100 includes a simplified example of classic client-server architecture. One or more shareholders or users 505, e.g., end users, operate on one or more client systems 520. Users 505 may concurrently request different services or execute various operations available within client systems 520, or provided by one or more server systems 540 via network 510. The illustrated server systems 540 represent one or more back-end nodes in the computer system landscape 500. Data from various database entities 575 stored at repository 570 may be accessed during the execution of the requested services or operations.

The client systems 520 and the server system nodes 540 communicating via network 510 may define a number of different computer system environments. Structures with similar functionalities could be found in software products developed by various software vendors. Alternative embodiments may utilize other kinds of computer system architectures.

The involved client systems 520 may have similar or different structures where one or more of the illustrated modules are replicated. One or more users 505 may operate within one or more instances of user interface (UI) client 524 of one or more of client systems 520. Different users 505 may exclusively access different instances of the UI client 524 within a same client system 520.

In one embodiment, any of client systems 520 may execute a standalone client application, e.g., client engine 522, to interact with the backend server system 540. Alternatively, an intermediate layer may be downloaded to any of the client systems 520 as an extension of a running Internet browser. Such intermediate layer may be also illustrated as client engine 522. The standalone client application and the intermediate layer may have similar components and functionality. Client engine 522 takes responsibility for rendering the necessary client functionality, and also for communicating with server systems 540 via network 510 when necessary.

The client engine 522 includes UI client instances or sessions 524 that may also embed into a browser integrated framework. The UI client 524 may be a part of any popular browser integrated framework, e.g. Silverlight® provided by Microsoft Corp, Flex® provided by Adobe Systems Inc., JavaFX® originally developed by Sun Microsystems Inc., etc. In one embodiment, the client engine 522 and UI client 524, respectively, may be desktop application, for example, a .NET® application rendering a UI through a Windows Prosecution Foundation (WPF) system. The UI client 524 accesses the necessary business data at the backend 540 through remote access layer 534 via network 510. In one embodiment, no dedicated UI server or client programs are needed. The communication with the backend 540 may include extracting, storing and updating data. The data may be transported to repositories 570, especially when backend 540 implements a number of server nodes in separate computer system environments.

In one embodiment, users 505 generate services requests at UI client 524. UI components module 128 instantiates one or more appropriate graphical user interface (GUI) screens or controls in response to the user request. The behavior of the UI components could be managed by controller 526. The controller 526 makes sure that all instantiated controls in the UI components 528 are initialized. The controller is also responsible for the execution of any configured operation triggered by events corresponding to the instantiated controls. In case when some of the operations involve execution of script segments, the controller 526 may trigger the execution of these scripts via scripts module 530. In one embodiment, scripts module 530 is a frontend scripting engine. Analytics module 532 may be used for frontend data processing when necessary.

In one embodiment, the backend 540 utilizes presentation layer 542 to connect to the Internet and/or to other public or private networks, and to provide access for the UI client sessions 524 to underlying business functions and data structures. For example, the presentation layer 542 may generate the UI object model underlying the UI controls instantiated in the UI components module 528 at the client systems 520. In one embodiment, presentation layer 542 may be part of the server runtime 544. The presentation layer may instantiate a separate application server session corresponding to one or more of the active UI client sessions 524 (not illustrated).

The server runtime 544 provides environment where one or more software applications 546 are executed. For example, the applications 546 may provide a number of business services for the users 505, where various operation requests related to the business services are created at client systems 520. The requests are translated to corresponding process tasks performed by the applications 546 executed in server runtime 544.

In one embodiment, the server runtime 544 includes backend controller 548 for one or more UI client sessions 524 to handle the requested UI components, e.g., when a UI client session 524 triggers an initialization of a UI component for the first time. The backend controller 548 may manage the collaboration between the requested UI components and one or more underlying business objects, e.g., via the corresponding application server session. System services 550 in the server runtime 544 may be used to administer the characteristics of the server runtime 544, e.g., its engine parameters, the user access to one or more components, the processes execution, the communication with other runtime environments, like, external systems, databases, etc. In one embodiment, system services 550 may also provide deployment, setup and change management of software components. The database layer, handling the communication with the database entities 575 and the database messaging channels framework, may be provided as system service 550.

Metadata repository 552 may be the place where metadata about the computer programs deployed in the server system 540 is preserved, according to one embodiment. There are different kinds of metadata that could be maintained by the metadata repository 552. For example, the repository 552 keeps the description of the business objects 556 underlying the applications 546. In one embodiment, metadata repository 552 keeps description of the available UI components 558 and the relationships between them as designed.

Repository engine 554 could manage the metadata and the collaboration with the server runtime 544 at one hand, and with various service providers 565 at the other hand. The service providers 565 may render services and/or corresponding UI components to the backend 540 as defined in the metadata. The service providers 565 are available via service provider interfaces 560, and can be either internal or external to the backend 540. In one embodiment, backend services adaptation 562 represents a layer that helps to adjust the designed UI or rendered UI components to a set of normalized business objects available at the server system 540. In one embodiment, the messaging infrastructure implemented in backend system 540 and used for database triggered push notification may be provided by service provider 565. The service provider interfaces 560 could be used for communication with the repository 570.

In a multi server system environment, e.g., in a cluster of more than one server system nodes 540, repository 570 may be used to persist different kinds of common data, including programming code, business data, data dictionaries, etc. (e.g., DB entities 575 and references 580). In one embodiment, one or more different repositories 570 may be assigned to different computer system environments defined in the computer system landscape 500.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
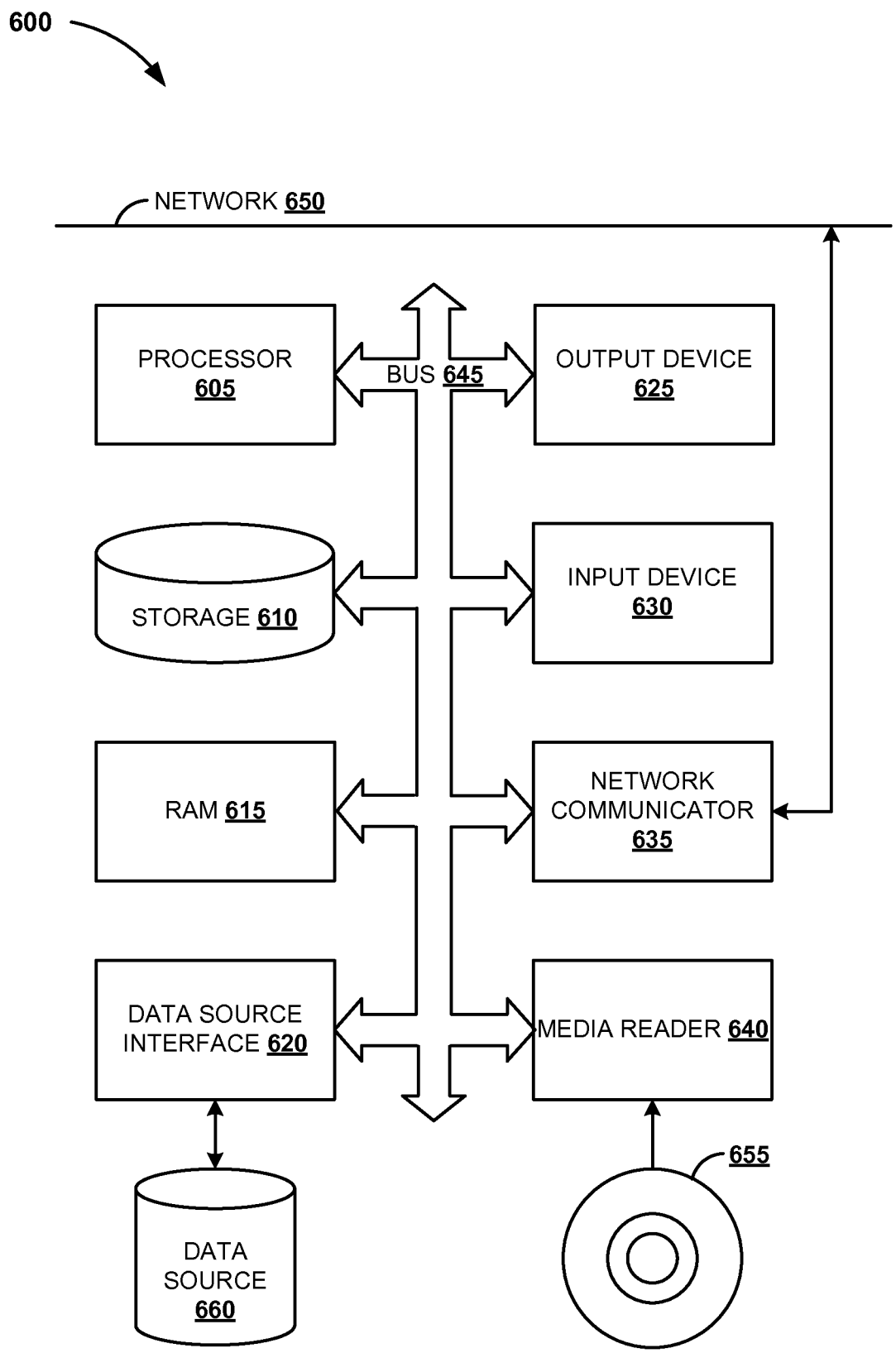
FIG. 6 is a block diagram of an exemplary computer system, according to an embodiment.

FIG. 6 is a block diagram of an exemplary computer system 600. The computer system 600 includes a processor 605 that executes software instructions or code stored on a computer readable storage medium 655 to perform the above-illustrated methods. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed via network 650. In some embodiments the data source 660 may be accessed by an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the presented embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limiting to the precise forms disclosed. While specific embodiments and examples are described herein for illustrative purposes, various equivalent modifications are possible, as those skilled in the relevant art will recognize. These modifications can be made in light of the above detailed description. Rather, the scope of the specification is to be determined by the following claims, which are to be interpreted in accordance with established doctrines of claim construction.

What is claimed is:

1. A non-transitory computer-readable medium storing instructions which, when executed by at least one processor, cause a computer system to perform activities comprising:
    execute at least one operation at a database entity;
    in response to executing the at least one operation at the database entity, generate a subscription to a messaging channel for at least one subscriber, wherein the messaging channel is dedicated to the database entity via one-to-one correspondence relationship;
    activate a database trigger defined for the database entity and in communication with the messaging channel, wherein the database trigger is invoked in response to executing the at least one operation at the database entity, and wherein the database trigger generates and sends an inbound message to the messaging channel of the database entity;
    receive the inbound message at the messaging channel;
    upon receiving the inbound message, push at least one outbound message to the at least one subscriber;
    in response to the at least one outbound message, retrieve data from the database entity; and submit the retrieved data to refresh at least one cache associated with the at least one subscriber.

2. The computer readable medium of claim 1 further storing instructions which, when executed by the at least one processor, cause the computer system to perform activities comprising:
   push a notification based on the retrieved data to update at least one client user interface corresponding to the at least one subscriber.

3. The computer readable medium of claim 1 further storing instructions which, when executed by the at least one processor, cause the computer system to perform activities comprising:
   receive a request involving the at least one operation at the database entity;
   in response to receiving the request, retrieve initial data from the database entity; and
   submit the retrieved initial data to the at least one cache.

4. The computer readable medium of claim 3 further comprising:
   receive the inbound message in response to invoking the trigger by the execution of the at least one operation, wherein the inbound message including metadata for the at least one operation; and
   transport at least part of the metadata by the at east one outbound message.

5. The computer readable medium of claim 4, wherein retrieving the data from the database entity comprises:
   retrieve the data based on the at least part of the metadata in the at east one outbound message.

6. A computer implemented method of database triggered messaging notification, the method comprising:
   executing an operation at a database entity;
   in response to executing the operation at the database entity, generating a subscription to a messaging channel for at least one user interface (UI) session, wherein the messaging channel s dedicated t the database entity via one-to-one correspondence relationship;
   activating a database trigger defined for the database entity and in communication with the messaging channel, wherein the database trigger is invoked in response to executing the operation at the database entity, and wherein the database trigger generates and sends an inbound message to the messaging channel of the database entity;
   receiving, at the messaging channel of the database entity, the inbound message, wherein the inbound message including metadata for the operation;
   upon receiving the inbound message, sending at least one outbound message to the at least one UI session subscribed to the messaging channel;
   upon receiving the at least one outbound message, a processor of a computer system retrieving data from the database entity;
   submitting the retrieved data to refresh at least one volatile memory cache associated with the at least one subscribed UI session; and
   pushing the retrieved data, over network, to update at least one client UI corresponding to the at least one subscribed UI session.

7. The method of claim 6 further comprising:
   receiving, at the UI session, a request involving the operation at the database entity;
   in response to receiving the request, retrieving initial data from the database entity; and
   submitting the retrieved initial data to the at least one volatile memory cache associated with the UI session.

8. The method of claim 6, wherein sending the at least one outbound message comprises:
   transporting at east part of the metadata by the at least one outbound message to the at least one subscribed UI session.

9. The method of claim 8, wherein retrieving the data from the database entity comprises:
   retrieving the data based n the at least part of the metadata transported by the at least one outbound message.

10. A computer system providing database triggered messaging notification, the system comprising:
    a memory to store computer readable instructions;
    a processor communicatively coupled with the memory to execute the stored computer readable instructions to execute at least one operation at a database entity for at least one cache associated with at least one client, and
    a messaging channel dedicated via one-to-one correspondence relationship to the database entity to receive at least one subscription for the at least one client in response to executing the at least one operation at the database entity, receive an inbound message from a database trigger activated, in response to the execution of the at least one operation at the database entity, and generate the least one outbound message in response to the inbound message and based on the at least one subscription, wherein the activated database trigger is defined for the database entity and communicates with the messaging channel of the database entity.

11. The system of claim 10, wherein the processor to execute instructions further to:
    reread the data from the database entity for the at least one cache in response to the at least one outbound message; and
    push at least one notification to the at least one client in response to the at least one outbound message.

12. The system of claim 10, wherein the processor to execute instructions further to:
    cancel a currently executing service request in response to an outbound message of the at least one outbound message, wherein the service request involves the at least one operation at the database entity.

13. The system of claim 10, wherein the processor to execute instructions further to:
    receive a service request from a client, wherein the service request involves the at least one operation at the database entity; and
    read initial data from the database entity in response to the service request.

14. The system of claim 13, wherein the processor to execute instructions further to:
    activate the messaging channel dedicated to the database entity in response to executing the at least one operation at the database entity.

15. The system of claim 14, wherein the processor to execute instructions further to:
    generate the at least one outbound message to include at least part of metadata for the at least one operation executed at the database entity, wherein the metadata is transported by the inbound message.

* * * * *